(12) United States Patent
Maeda et al.

(10) Patent No.: US 6,400,341 B1
(45) Date of Patent: *Jun. 4, 2002

(54) HEAD-MOUNTED PICTURE DISPLAY DEVICE

(75) Inventors: Yoshihiro Maeda; Motohiro Atsumi, both of Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/288,354

(22) Filed: Apr. 8, 1999

(30) Foreign Application Priority Data

Apr. 10, 1998 (JP) .......................................... 10-099512

(51) Int. Cl.$^7$ ................................................ G09G 5/00
(52) U.S. Cl. ........................................ 345/8; 359/630
(58) Field of Search ........................ 345/7, 8; 359/13, 359/630, 631

(56) References Cited

U.S. PATENT DOCUMENTS 5,949,388 A * 9/1999 Atsumi et al. ................. 345/8
6,134,051 A * 10/2000 Hayakawa et al. .......... 359/630
6,201,647 B1 * 3/2001 Ohzawa ....................... 359/631
6,215,461 B1 * 4/2001 Ishibashi et al. ............... 345/8

FOREIGN PATENT DOCUMENTS

| JP | 6141259 | 5/1994 |
| JP | 6315123 | 11/1994 |
| JP | 8136852 | 5/1996 |

* cited by examiner

*Primary Examiner*—Kent Chang
(74) *Attorney, Agent, or Firm*—Ostrolenk Faber Gerb & Soffen, LLP

(57) ABSTRACT

A head-mounted picture display device which includes a picture display system and front and back covers. The picture display system includes LCDs for displaying pictures and prisms for introducing the pictures to the observer's eyes. The front and back covers are designed to accommodate the picture display system and are formed by molding with dies so as to be separated from each other in a predetermined direction. The back cover has surfaces tilted substantially along the emission surfaces of the prisms. The surfaces each have a substantially rectangular aperture. Transparent plates are press-fitted in the apertures. The transparent plates are held in a position at an angle relative to a vertical axis and a transversal axis of the housing body.

10 Claims, 9 Drawing Sheets

FIG.6
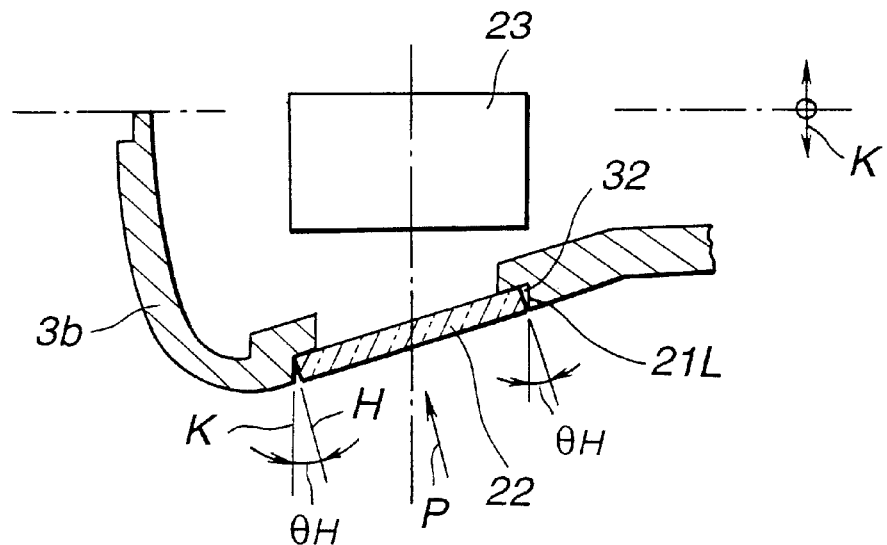
FIG.7A
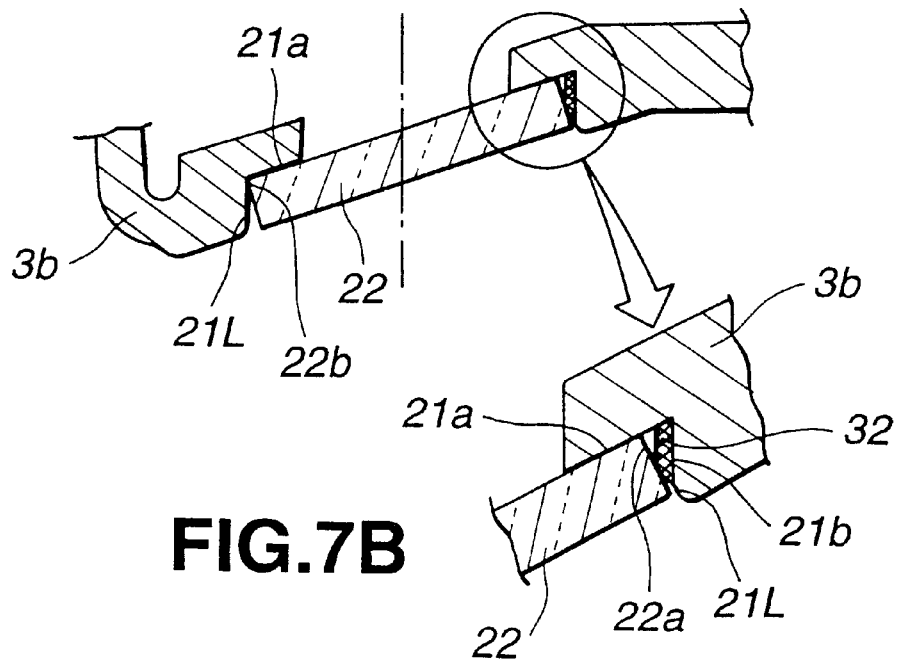
FIG.7B

HEAD-MOUNTED PICTURE DISPLAY DEVICE

BACKGROUND OF THE INVENTION

1. Field of the Invention

The present invention relates to a head-mounted picture display device, or more particularly, to a head-mounted picture display device having a picture display system stowed in a housing body.

2. Description of the Related Art

A head-mounted picture display device designed to be mounted on the observer's head in a manner which will partly mask the observer's face gains advantages over other portable picture display devices. Specifically, the head-mounted picture display device enables a person to view a picture while having his/her hands free. Moreover, since the head-mounted picture display device can offer a field of view analogous to one provided by viewing a large screen, a picture can be viewed with a sense of reality and impact.

In this kind of head-mounted picture display device, extraneous light is reflected from emission surfaces for emitting picture beams. Images from the background of the device may therefore be projected to hinder viewing of a picture. Various proposals have been made address this drawback in the past.

A glasses type picture display device is disclosed as an example of such head-mounted picture display devices in Japanese Unexamined Patent Publication No. 6-141259. Pictures produced by a pair of picture display means incorporated in a main unit are enlarged by a pair of eyepieces and projected on the retinas of the user's eyes. A pair of eyepiece windows is created to be opposed to the pair of eyepieces in the main unit. Transparent window plates are fitted in the eyepiece windows. The transparent window plates are tilted at a predetermined angle with respect to the eyepieces. Due to the tilted transparent window plates, reflection of unnecessary external light surrounding a picture is prevented so as effort to make the picture on a product panel easier to see.

Moreover, Japanese Unexamined Patent Publication No. 8-136852 has disclosed another example of an optical device which includes an eyepiece optical system for transmitting an image to an observer and reflecting mirrors for reflecting light that produces an image. The eyepiece optical system has sheet polarizers or optical absorption filters interposed between the reflecting mirrors and the observer's eyes. Occurrence of glares or ghost images caused by leakage light can be prevented, thus enabling viewing of a good image.

However, in the foregoing technological examples, special consideration has not been given to the relationship between the transparent plates in the portions to which beams producing the pictures are irradiated and the housing body accommodating the transparent plates. Complex dies may therefore be needed for molding the housing body or a plurality of members must be assembled to construct the housing body. There is thus a probability of inviting an increase in cost.

Furthermore, there is a possibility that the transparent plates mounted in the housing body during the process of manufacturing may be dismounted or displaced until they are secured using an adhesive or the like. Every time the transparent plates are dismounted or displaced, they must be remounted or repositioned. This leads to degraded work efficiency.

Moreover, the transparent plates are designed to be larger so that they can easily pass the beams forming the pictures and emanating from optical elements such as prisms. Consequently, the large area of the transparent plates are susceptible to having a background or the like being readily be projected to the surrounding areas, and may cause the design of the head-mounted picture display device to be undesiredly bulky.

SUMMARY OF THE INVENTION

An object of the present invention is to provide a low-cost head-mounted picture display device in which transparent plates can be properly united with a housing body.

Briefly, the present invention provides a head-mounted picture display device comprising a picture display system and a housing body. The picture display system includes picture display members for producing pictures according to a supplied video signal, and optical elements for introducing beams which transmit the pictures produced by the picture display members to the observer's eyes. The housing body accommodates the picture display system. The housing body has light transmitting portions formed by covering through, which the beams emitted from the optical elements are propagated to the observer's eyes, with transparent plates. The transparent plates are fitted in the apertures in such a position that the normal vectors to the main surfaces of the transparent plates will intersect the plane at which the front and back members of the housing body are joined.

Moreover, the present invention provides a head-mounted picture display device comprising a picture display system and a housing body as above, and further in which by the transparent plates main surfaces will extend along abutment planes surrounding the apertures of the housing body.

Furthermore, the present invention provides a head-mounted picture display device comprising a picture display system and a housing body as described above and wherein the transparent plates are fitted in the apertures so that the center positions thereof will not be aligned with the ray axes of the beams emitted from the optical elements.

The present invention provides a head-mounted picture display device comprising picture display members, optical elements, and window frame members. The picture display members produce pictures according to a supplied video signal. The optical elements introduce beams, which transmit the pictures produced by the picture display members towards the observer's eyes. The window frame members restrict the viewable range in which the emitted beams can propagate from the optical elements towards the observer's eyes, and thus limits a view zone. The window frame members have the center positions of the light transmitting areas thereof set so that the center positions will not be aligned with the ray axes of the beams emitted from the optical elements.

These objects and advantages of the present invention will become further apparent from the following detailed explanation.

BRIEF DESCRIPTION OF THE DRAWINGS

FIG. 6 is a planar cross-sectional view of a transparent plate mounted on a back cover of the head-mounted picture display device of the embodiment;

FIG. 7A is an enlarged planar cross-sectional view of the transparent plate shown in FIG. 6;

FIG. 7B is an enlarged planar cross-sectional view of a convex part shown in FIG. 7A;

DESCRIPTION OF THE PREFERRED EMBODIMENT

An embodiment of the present invention will be described with reference to the drawings.

Figure 1:
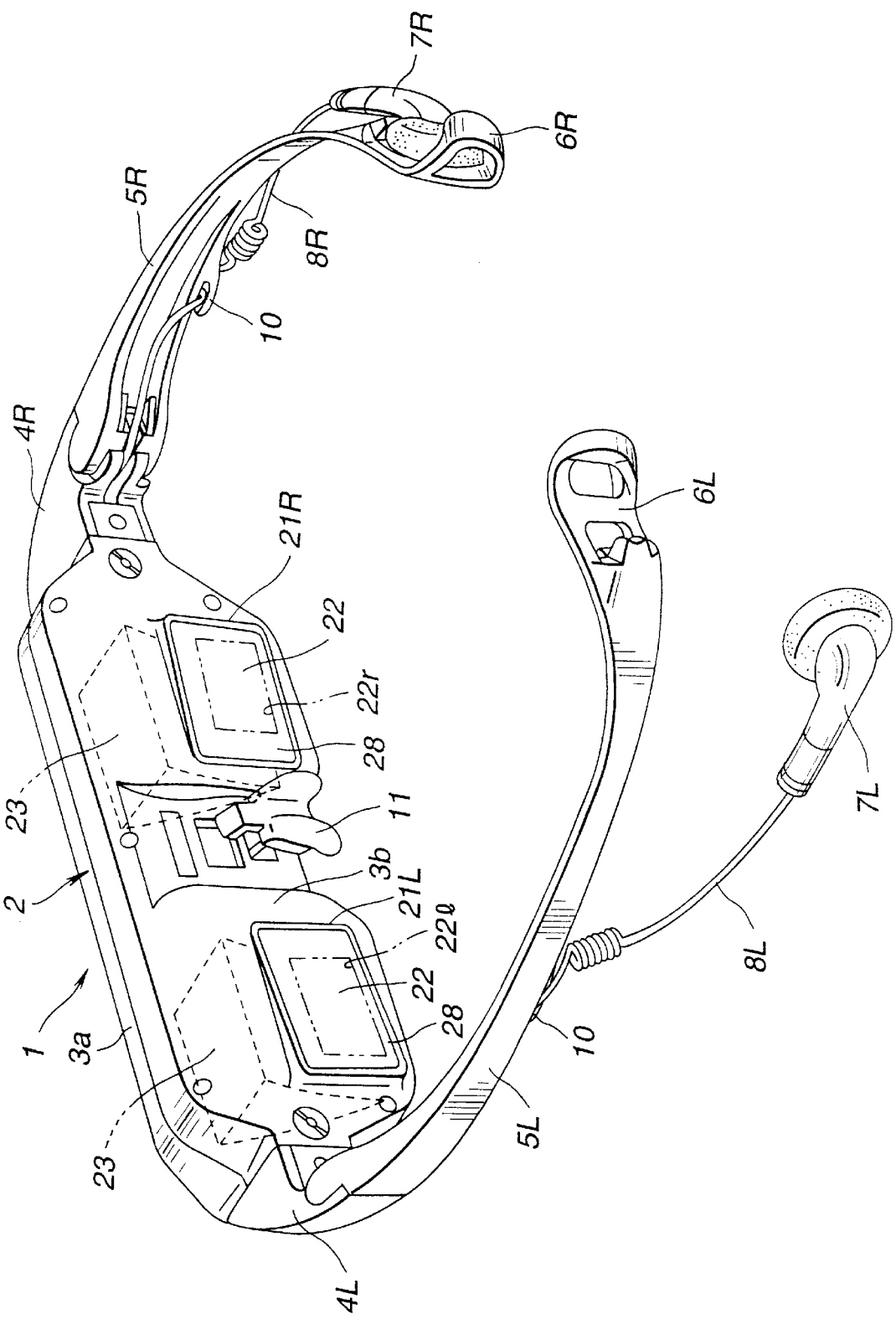
FIG. 1 is an oblique view showing a head-mounted picture display device of an embodiment of the present invention from the back side thereof.
Figure 2:
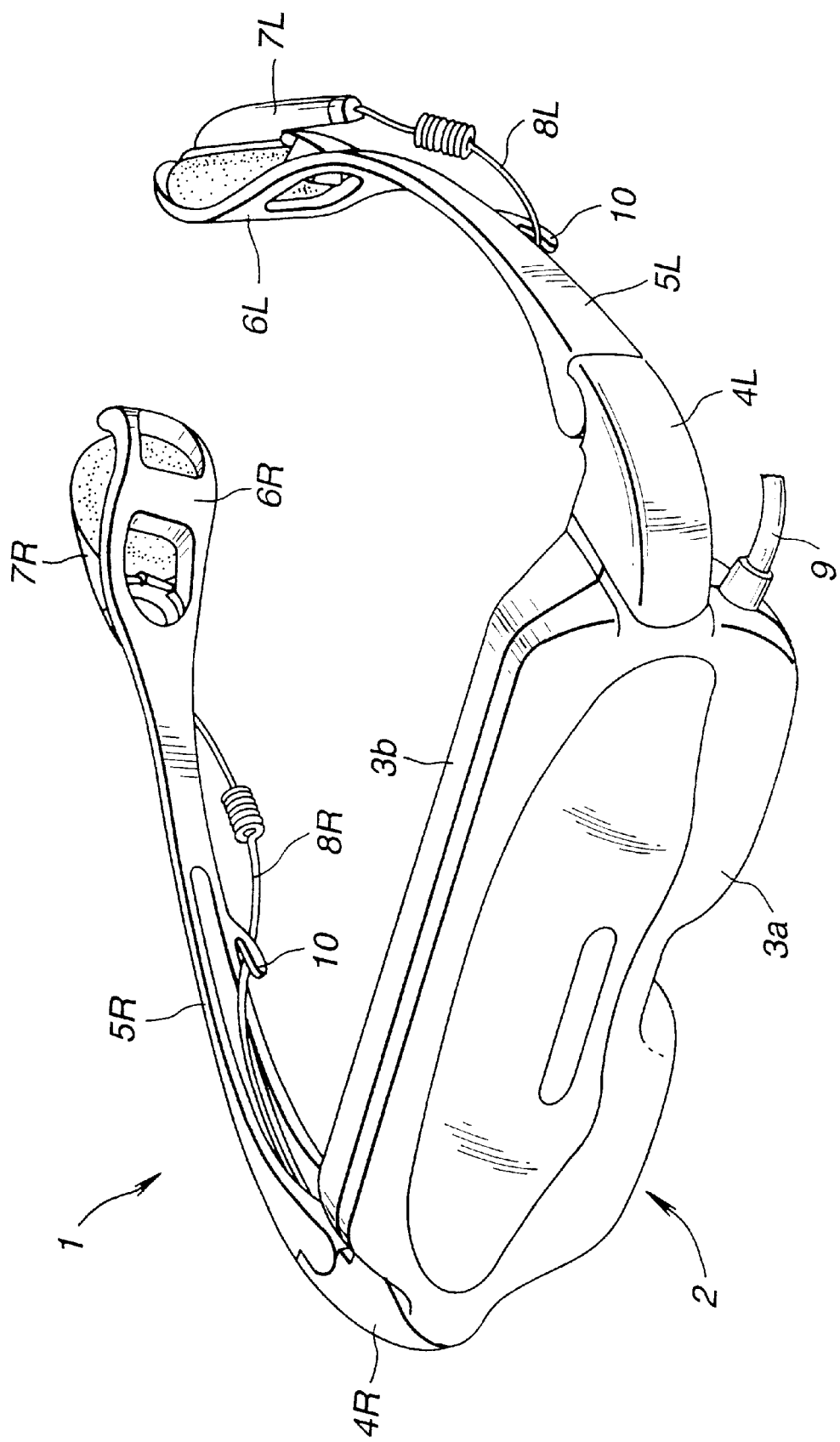
FIG. 2 is an oblique view showing the head-mounted picture display device of the embodiment from the front side thereof.
Figure 3:
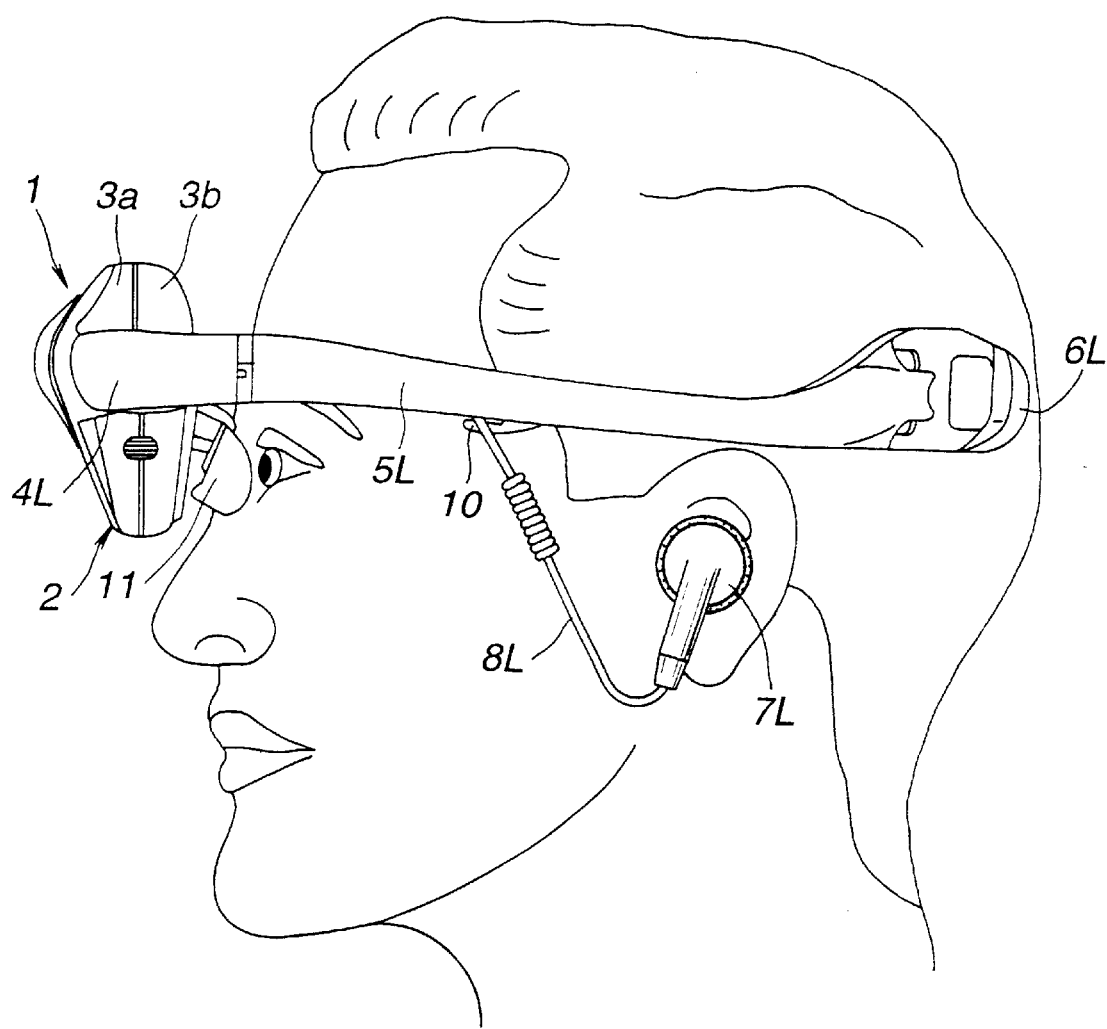
FIG. 3 is a side view showing the head-mounted picture display device of the embodiment mounted on the observer's head.
Figure 4:
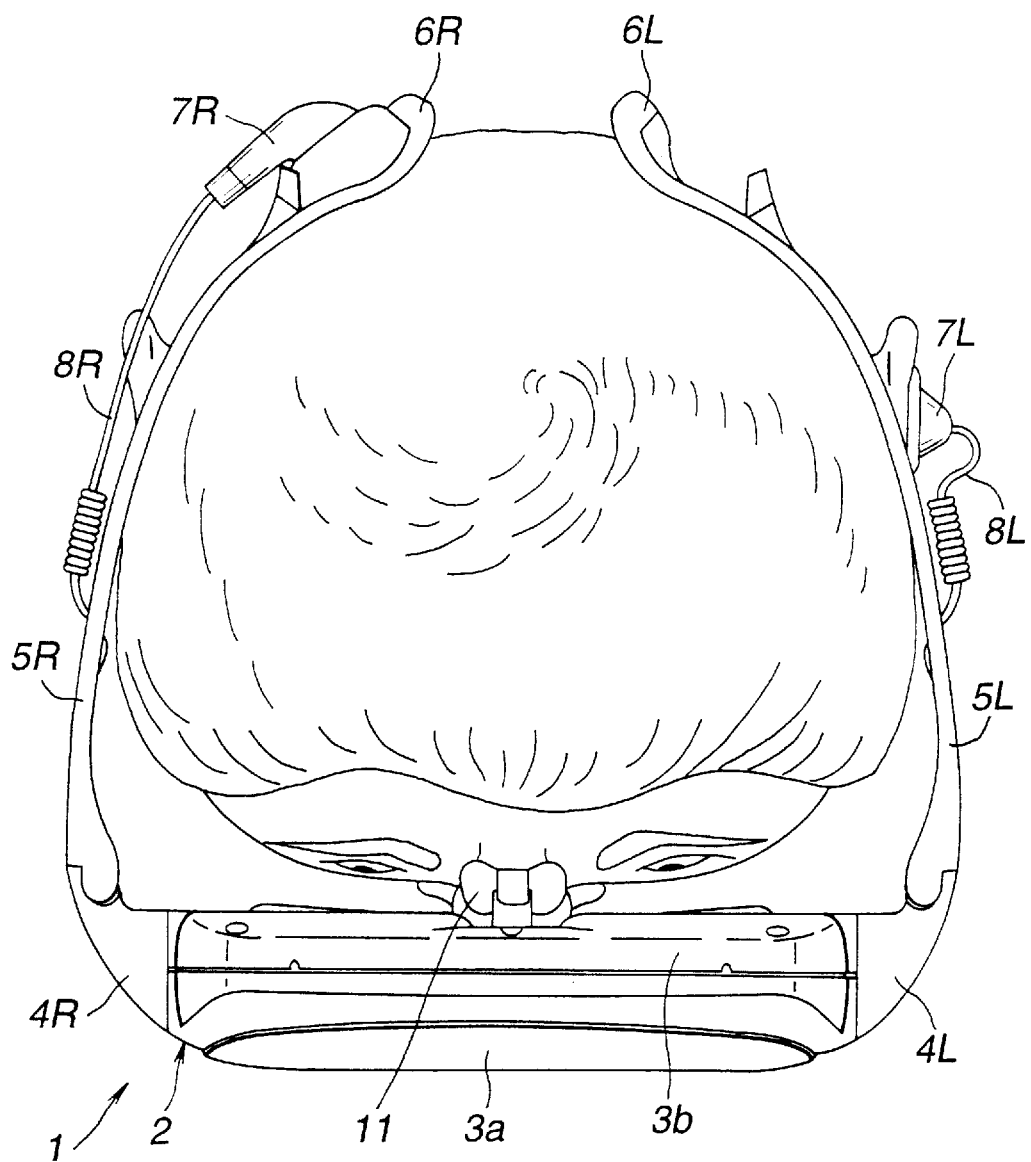
FIG. 4 is a plan view showing the head-mounted picture display device of the embodiment mounted on the observer's head.
Figure 8:
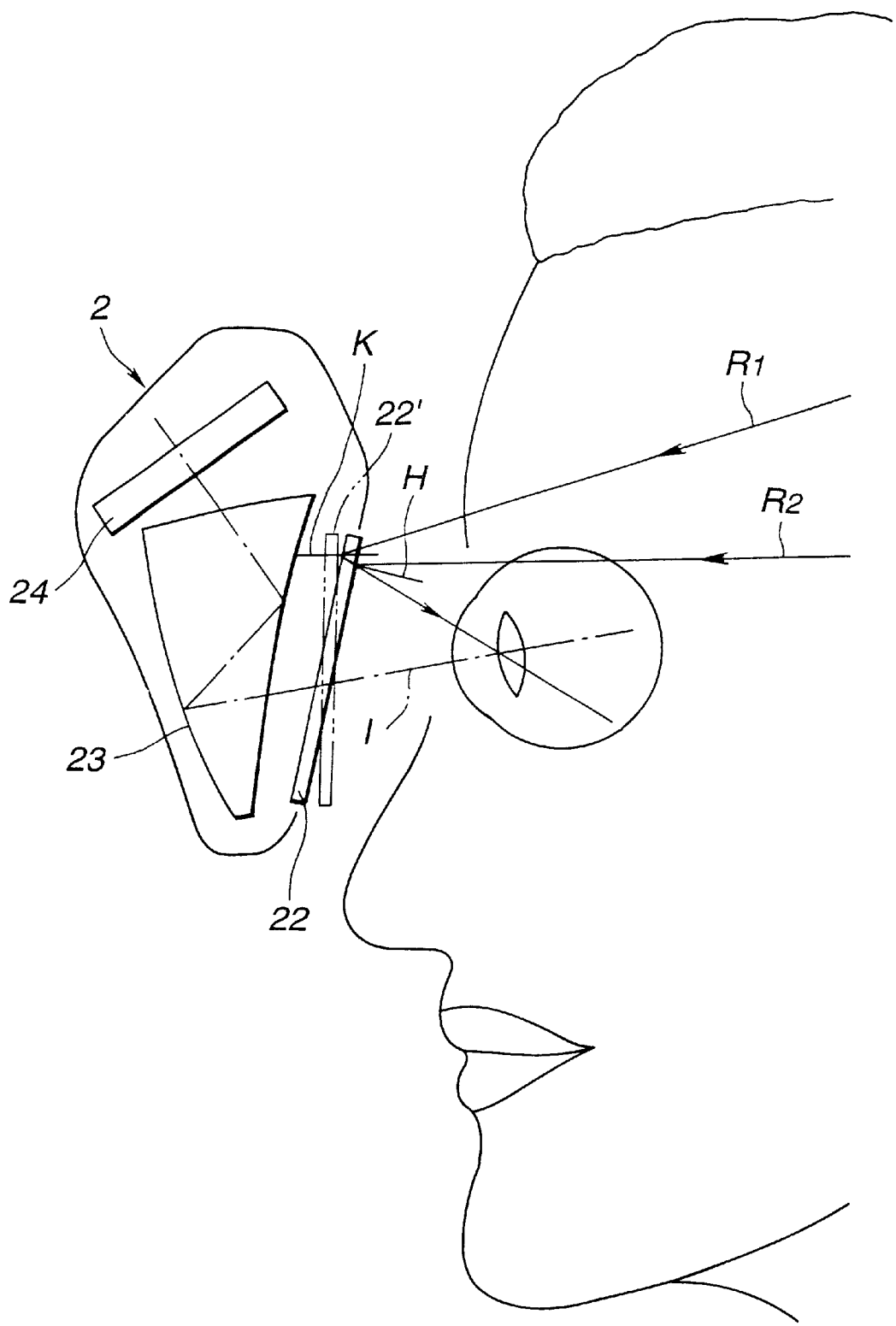
FIG. 8 shows a scene in which extraneous light emitted from above is reflected by a transparent plate of the head-mounted picture display device of the embodiment.
Figure 9:
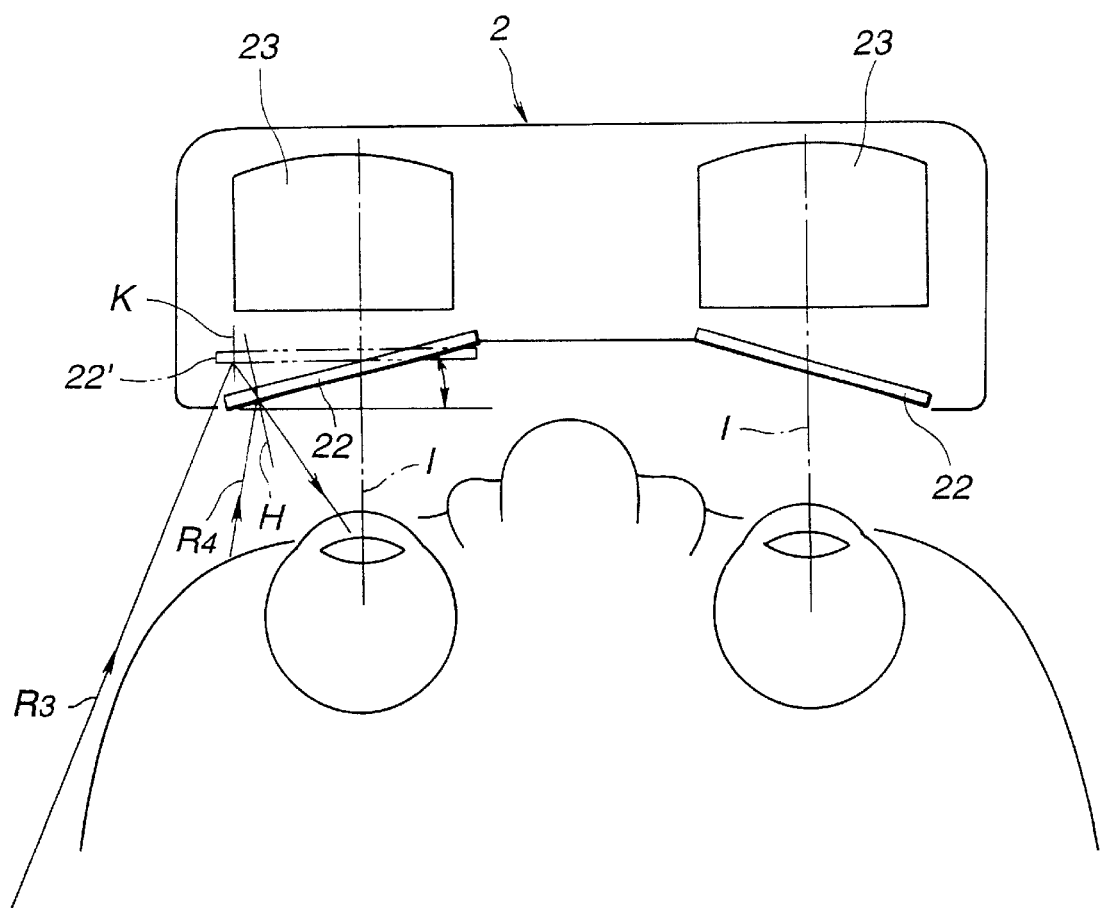
FIG. 9 shows a scene in which extraneous light emitted from the outside periphery of the device is reflected by a transparent plate of the head-mounted picture display device of the embodiment.
Figure 10:
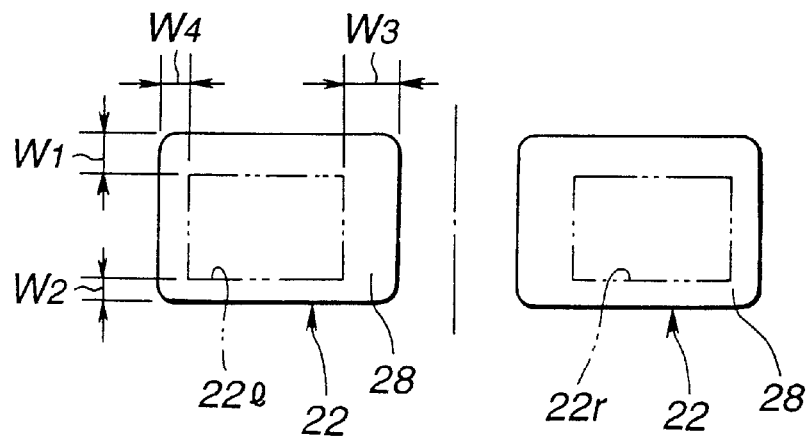
FIG. 10 is a back view of the head-mounted picture display device of the embodiment showing a beam transmission area and frame area of the transparent plate.
Figure 11:
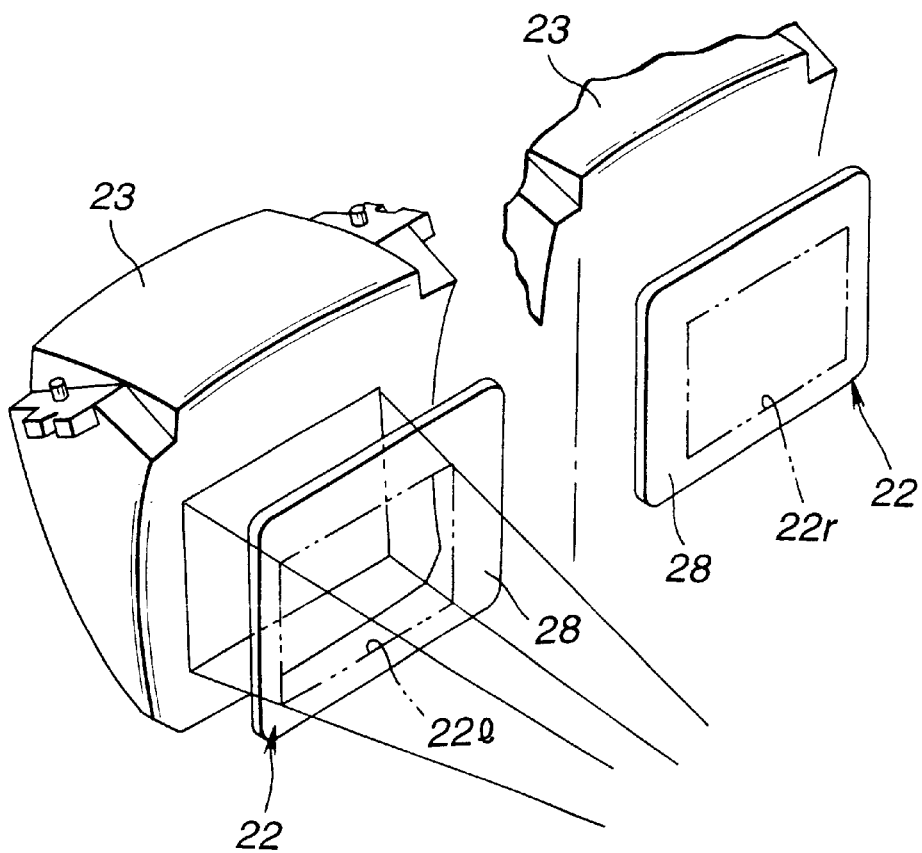
FIG. 11 is an oblique view of the head-mounted picture display device of the embodiment showing a scene in which a beam emanating from a prism passes through the beam transmission area of the transparent plate, as viewed from the back side of the head-mounted picture display device.

FIG. 1 to FIG. 11 show one embodiment of the present invention. FIG. 1 is an oblique view showing a head-mounted picture display device from the back side thereof. FIG. 2 is an oblique view showing the head-mounted picture display device from the front side thereof. FIG. 3 is a side view showing the head-mounted picture display device mounted on the observer's head. FIG. 4 is a plan view showing the head-mounted picture display device mounted on the observer's head. FIG. 5A is a longitudinal cross-sectional view of a main unit of the head-mounted picture display device along the optical axis of a picture display system. FIG. 5B is an enlarged cross-sectional view of a convex part shown in FIG. 5A. FIG. 6 is a planar cross sectional view showing a transparent plate mounted on a back cover. FIG. 7A is an enlarged planar cross-sectional view of the transparent plate shown in FIG. 6. FIG. 7B is an enlarged planar cross-sectional view of a convex part shown in FIG. 7A. FIG. 8 shows a scene in which extraneous light emitted from above the observer's eyes is reflected by the transparent plate. FIG. 9 shows a scene in which extraneous light emitted from the sides of the device is reflected by the transparent plate. FIG. 10 is a back view showing a beam transmission area and frame area of the transparent plate. FIG. 11 is an oblique view showing a scene in which a beam emanating from a prism passes through the light transmission area of the transparent plate, as viewed from the back side of the head-mounted picture display device.

A head-mounted picture display device 1 includes, as shown in FIG. 1 to FIG. 4, a main unit 2, joint members 4L and 4R, head supporting frames 5L and 5R, earphone holding portions 6L and 6R, earphones 7L and 7R, earphone cables 8L and 8R, cable holding portions 10, a main cable 9, a nose rest member 11, and transparent plates 22.

The main unit 2 has an incorporated picture display system including prisms 23 shielded with a front cover 3a and back cover 3b. The joint members 4L and 4R are fixed to the left and right sides of the main unit. The head supporting frames 5L and 5R are pivotally attached to the joint members 4L and 4R so that they can be folded. The earphone holding portions 6L and 6R are formed at the ends of the head supporting frames 5L and 5R furthest from the main unit 2. The inner phones 7L and 7R are stowed in the earphones holding portions 6L and 6R, respectively if necessary. A voice signal is transmitted to the earphones 7L and 7R respectively over the earphone cables 8L and 8R. The cable holding portions 10 are formed on the head supporting frames 5L and 5R. The cable holding portions 10 retain the earphone cables 8L and 8R at the temporal regions of the head so as to prevent the earphone cables 8L and 8R from dangling in front of the user's eyes. The main cable 9 extends from the lower part of the joint member 4L and is used to transmit a video signal and voice signal to the head-mounted picture display device 1. The nose rest member 11 projects from the main unit 2 can be stretched or contracted. The nose rest member 11 abuts on the observer's nose so as to support the main unit 2 in cooperation with the head supporting frames 5L and 5R. The transparent plates 22 are located to the left and right sides of the nose rest member 11, and fitted in substantially rectangular apertures 21L and 21R formed in the back cover 3b. Beams emanating from the prisms 23 are emitted to the transparent plates 22.

Figure 5A:
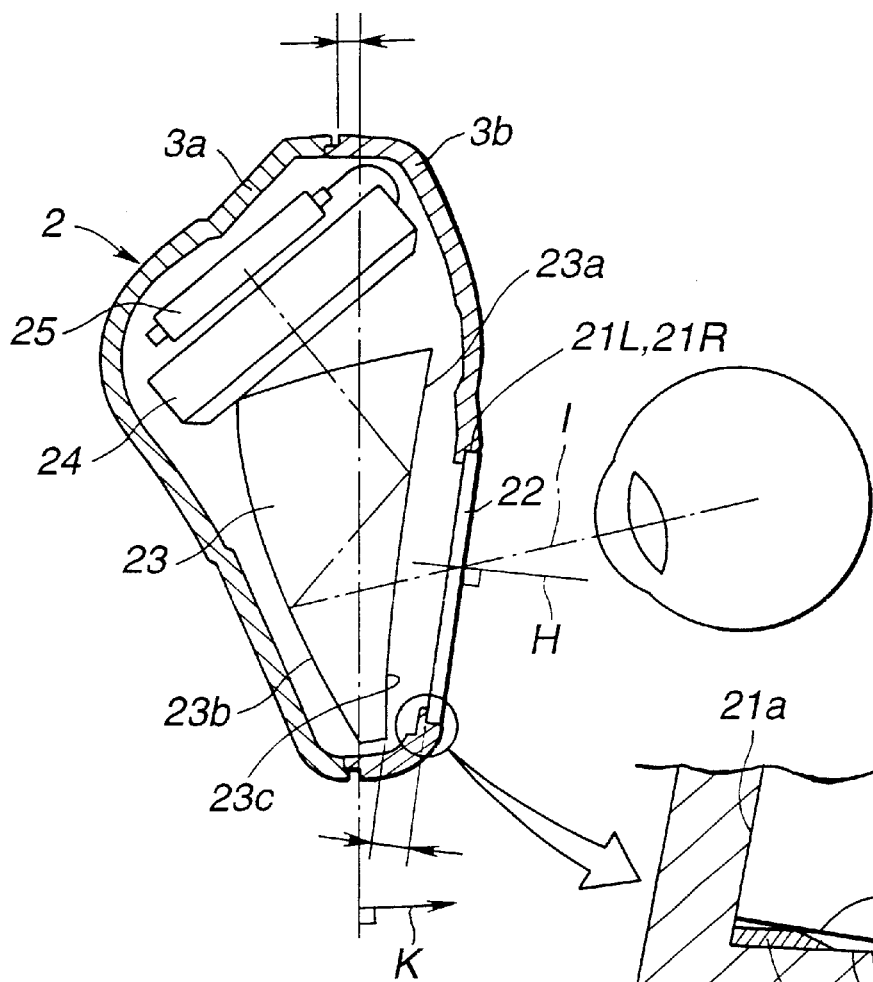
FIG. 5A is a longitudinal cross-sectional view of a main unit of the head-mounted picture display device of the embodiment along the optical axis of a picture display system.

Moreover, the picture display system is, as shown in FIG. 5A composed of backlights 25, liquid crystal display elements (LCD) 24, and the prisms 23. The backlights 25 irradiate illumination light for displaying a picture. The LCDs 24 are picture display members for producing pictures according to a supplied video signal. The prisms 23 are optical elements for reflecting beams which transmit the pictures produced by the LCDs 24 from first reflecting surfaces 23a and second reflecting surfaces 23b. The prisms 23 then emit the beams through emission surfaces 23c located on the same planes as the first reflecting surfaces but at different positions therefrom. The emitted beams are thus introduced to the observer's eyes. The cross-sections of the prisms 23 extend approximately along the optical axis of the picture display system and are substantially triangular. These components are securely fixed in an optical system holding member.

Beams transmitting pictures to the LCDs 24 illuminated by the backlights 25 travel obliquely down to the prisms 23. The beams are reflected forwardly and downwardly by the first reflecting surfaces 23a, and are further reflected backward with a slight incline above by the second reflecting surfaces 23b. Thereafter, the beams are emitted from the prisms 23 through the emission surfaces 23c located below the first reflecting surfaces 23a on the same planes. After passing through beam transmission areas 22l and 22r inside frame areas 28 of the transparent plates 22 which will be described later, the beams I reach the observer's eyes.

The front cover 3a and back cover 3b each have, as shown in FIG. 5A, upper and lower molded surfaces that are substantially parallel to each other and are formed having a slight step between them at their juncture. The front cover 3a and back cover 3b are molded by separate dies such that a direction K is substantially perpendicular to these molded surfaces.

The portion of the back surface of the back cover 3b in which the apertures 21L and 21R are formed extend substantially along the contours of the emission surfaces 23c of the prisms 23 that are substantially triangular. In other words, the portion of the back surface of the back cover 3b is formed so as to slope slightly downward. Furthermore, when the back surface of the back cover 3b is seen in a tranverse cross-section, as shown in FIG. 6, the portions of the back surface adapted to be placed near the observer's nose angled forward. On the other hand, the portions thereof placed further away from the observer's nose are angled backward. The transparent plates 22 are fitted in the apertures 21L and 21R along the appropriate portions of the back surface.

Figure 5B:
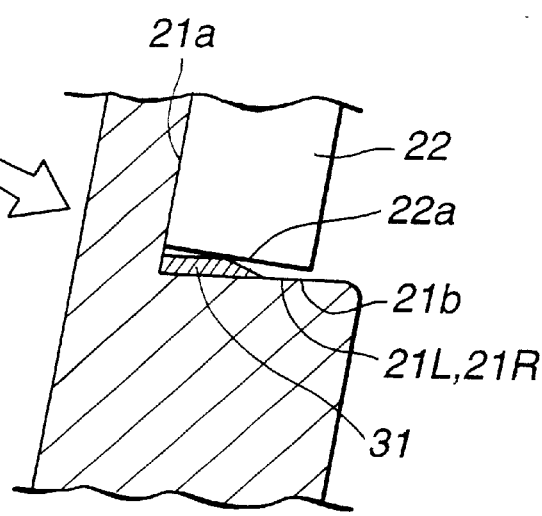
FIG. 5B is an enlarged longitudinal cross-sectional view of a convex part shown in FIG. 5A.

The transparent plates 22 are, as shown in FIG. 5B, fitted in the apertures 21L and 21R in such a manner that the major surfaces thereof abut against abutment surfaces 21a. The abutment surfaces 21a are each a surface of a step formed along the four sides of the substantially rectangular aperture 21L or 21R. In other words, the transparent plates 22 are, as shown in FIG. 5A, fitted in the apertures 21L and 21R in such a manner that the normals H on the.transparent plates 22 cross the direction K.

The transparent plates 22 are arranged so that when they are seen in a vertical direction, the normals H will decline slightly backwards as shown in FIG. 5A and FIG. 5B. Moreover, when the transparent plates 22 are seen in a transverse cross-section, they face a back lateral center, of the prism 23 as shown in FIG. 6.

In this case, the normals H cross the directions of the light beams I. Horizontally, the normals H cross the direction K other, at a proper angle θH.

The apertures 21L and 21R result, as mentioned above, from molding. An inner circumferential wall 21b extending in the direction K and the abutment surface 21a create an acute angle along one of the four sides of each rectangular aperture. Along the opposite of each rectangular aperture inner circumferential wall 21b and abutment surface 21a create an obtuse angle. The remaining pair of sides of each rectangular aperture is formed with a similar structure.

A convex part is molded as an integral part of the back cover 3b on at least one of the two acute angle sides of each aperture. For example convex part 31 is, as shown in FIG. 5B, formed in the acute-angle area along the lower side. Alternatively, a convex part 32 is, as shown in FIG. 7A and FIG. 7B, formed in the acute-angle area along the side close to the nose.

The convex part 31 or 32 contacts the side circumferential surface 22a of each transparent plate 22 so as to form a space therebetween which tapers toward the rear. The space is substantially enclosed by the side circumferential surface 22a of each transparent plate 22 and the inner circumferential wall 21b of the back cover 3b. The side circumferential surface 22a extends in the direction K, and facing the aperture 21L or 21R.

The convex part 31 or 32 is intended to secure each transparent plate 22 that is press-fitted into the respective aperture. With the formation of either the convex part 31 or 32, the function of securing a transparent plate is achieved satisfactorily.

The transparent plates 22 are press-fitted in the direction of arrow P in FIG. 6 into the apertures 21L and 21R each having the convex part 31 or 32 The convex part 31 or 32 causes each transparent plate 22 to be cantilevered in the aperture 21L or 21R. The corner 22b of each transparent plate 22 is pressed to the side of the aperture creating an acute angle. Thus, each transparent plate 22 is press-fitted with the corner 22b thereof abutted on the side of the aperture 21L or 21R creating the acute angle. The transparent plates 22 can therefore be positioned accurately. Moreover, the convex part 31 or 32 is formed in each of the left aperture 21L and right aperture 21R so that the convex parts will be symmetrical to each other. Therefore, when the transparent plates 22 are pressed and secured, they can be positioned symmetrically.

Thereafter, for example, an adhesive or the like is used to bond the transparent plates 22 to the apertures 21L and 21R respectively. Since the transparent plates 22 are press-fitted as mentioned above, they will not be dismounted or displaced during assembly.

As mentioned above, the distances between the transparent plates 22 fitted in the apertures 21L and 21R and the emission surfaces 23c of the prisms 23 are small at the sides thereof positioned near the observer's nose (sides of the left and right prisms near the middle of the head-mounted picture display device). The distance between the transparent plates 22 and the apertures are large at the sides thereof positioned away from the nose (sides of the left and right prisms near the edges of the display device). Thus even when a strong impact or vibration is imposed on the optical system holding member, the edges of the left and right prism will not interfere with the housing body including the back cover 3b. Herein, the optical system holding member is screwed to the back cover 3b at a point that is substantially the middle of the left and right prisms, but is not fully secured. Any impact or vibration presumably assumes the largest amplitude at the edges of the left and right prisms 23 held in the optical system holding member.

Furthermore, when the transparent plates 22 are arranged as mentioned above, unnecessary extraneous light is, as shown in FIG. 8 and FIG. 9, reflected from the surfaces of the transparent plates 22. This leads to a reduced amount of light incident on the observer's eyes.

Specifically, assume that the transparent plates are placed at positions 22' so that the normals to the main surfaces thereof will be aligned with the direction K. In this case, extraneous light R1 falling from above as shown in FIG. 8 reaches the observer's eyes. In contrast, when that the transparent plates are tilted to lie at positions 22 according to this embodiment light R2 reaching the observer's eyes is light reflected from a direction closer to the horizontal line than the extraneous light R1. The luminance of the observer's face is generally not very high. For practical purposes, no drawback will occur.

Likewise, extraneous light R3 falling laterally as shown in FIG. 9 reaches the observer's eyeballs when the transparent plates are placed at the positions 22'. This is because the extraneous light R3 is reflected from the edges of the transparent plates. In contrast, when that the transparent plates are tilted to lie at the positions 22 according to this embodiment, light R4 reaching the observer's eyes is light reflected from the observer's face. No drawback will occur for practical purposes.

Moreover, a dimension of a part of the frame area 28 of each transparent plate 22 away from the observer's nose is smaller as mentioned later. The amount of the extraneous light R3 reaching the observer's eyes can thus be further reduced.

The main surfaces of the left and right transparent plates 22 are each, as shown in FIG. 10 and FIG. 11, broadly divided into the beam transmission area 22l or 22r, and the frame area 28. The beam transmission area 22l or 22r is an area through which a beam emitted from each prism 23 passes. The frame area 28 is the perimeter of the beam transmission area.

The vertical width of the lower part of each frame 28 is smaller than that of the upper part thereof. Specifically, the vertical width W2 of the lower part of the frame area 28 surrounding the beam transmission area 22l or 22r is smaller than width W1 of the upper part thereof. Moreover, the lateral width W4 of the portion of the frame area 28 furthest away from the observer's nose is relatively smaller than width W3 of the portion thereof closer to the observer's nose. In other words, the left and right transparent plates 22 are fitted in the apertures 21L and 21R so that the center positions thereof will not be aligned with the ray axes of the beams emitted from the prisms 23.

Thus, the picture display system including the prisms 23 can be protected, and pictures transmitted by the beams emitted from the prisms 23 can be observed. Nevertheless, the transparent plates 22 can be designed compactly so that overall, the head-mounted picture display device 1 can be designed compactly.

The lateral dimension W4 of the portions of the frame areas 28 of the transparent plates 22 located away from the nose is made smaller as mentioned above. Extraneous light is reflected from these parts. Consequently, the possibility that an excess background may be projected on the plates 22 can be alleviated.

In the aforesaid head-mounted picture display device of this embodiment, the abutment surfaces are formed on the perimeters of the apertures in the back cover forming the housing body. The abutment surfaces are tilted in line with the contour of the contents including the prisms. The transparent plates are placed so that the main surfaces thereof will abut against the abutment surfaces. Consequently, the transparent plates formed as flat plates can be placed three-dimensionally without an increase in the number of parts. While an increase in cost is suppressed, the head-mounted picture display device can be designed compactly.

Moreover, the surfaces surrounding the apertures of the back cover on which the transparent plates are placed are tilted so that the contour of the housing body becomes three-dimensional. Consequently, the strength of the housing body can be improved a little. Furthermore, the weight balance can be shifted slightly backward. Thus, the burden an observer must bear during use can be alleviated.

The distances between the main surfaces of the transparent plates and the emission surfaces of the prisms are smaller at the sides thereof closer to the observer's nose. Correspondingly, the change on their distances are larger at the sides thereof away from the nose. Even if a strong impact or vibration is imposed on the optical system holding member, the edges of the left and right prisms will not interfere with the housing body including the back cover. Herein, the optical system holding member is screwed to the back cover at a point that is substantially the middle between the left and right prisms, but not secured fully. Moreover, any impact or vibration presumably assumes the largest amplitude at the edges of the left and right prisms held in the optical system holding member.

Furthermore, a convex part is formed on the perimeter of each aperture. When a transparent plate is fitted in the aperture, it is press-fitted and secured. Even when the transparent plate is not bonded using an adhesive or the like, the transparent plate will be neither dismounted nor displaced during assembly. In addition, the convex part is formed on one of four sides of each aperture on which the inner circumferential wall and abutment surface create an acute angle. A corner of each transparent plate is pressed against an opposite side of the aperture at which an obtuse angle is created. In this state, the transparent plate is brought into contact with the aperture. The transparent plate can therefore be positioned accurately. Moreover, the convex part of the left aperture and that of the right aperture are symmetrical. The transparent plates can therefore be positioned symmetrically.

The vertical width of the lower part of the frame area around each transparent plate is smaller than that of the upper part thereof and the lateral width of the portion of the frame area away from the nose is smaller than that of the portion thereof close to the nose. A compact design can be realized while required functions are sustained. Moreover, the possibility that excess background image is projected onto the transparent plates due to reflected extraneous light can be alleviated.

In the present invention, it is apparent that a wide range of different working modes can be formed based on the disclosure without a departure from the spirit and scope of the invention. This invention is therefore not restricted by any specific embodiment but is limited by the appended claims.

What is claimed is:

1. A head-mounted picture display device, comprising:
   a picture display system including picture display members for producing pictures transmitted by a supplied video signal, and optical elements for introducing beams which transmit the pictures produced by the picture display members to an observer's eyes; and
   a housing body accommodating the picture display system,
   wherein the housing body has light transmitting portions formed by apertures which permit propagation of the beams emitted from the optical elements towards the observer's eyes, the apertures being covered with transparent plates; and
   the transparent plates are fitted in the apertures and are positioned at an angle relative to a vertical axis and a transverse axis of the housing body.

2. A head-mounted picture display device according to claim 1, wherein the housing body has convex parts by which the transparent plates are secured when press-fitted into the apertures; and each convex part is formed along at least one side of a corresponding one of the apertures such that, when the corresponding transparent plate is press-fitted into the respective aperture, a substantially enclosed tapered space is formed between mutually facing surfaces alone the circumference of the transparent plate, the circumference of the housing body forming the aperture, and the convex part.

3. A head-mounted picture display device, comprising:
   a picture display system including picture display members for producing pictures transmitted by a supplied video signal, and optical elements for introducing beams which transmit the pictures produced by the picture display members to an observer's eyes; and
   a housing body accommodating the picture display system,
   wherein the housing body has light transmitting portions formed by apertures which permit propagation of the beams emitted from the optical elements towards the observer's eyes, the apertures being covered with transparent plates; and
   the transparent plates are fitted in the apertures and are positioned at an angle relative to a vertical axis and a transverse axis of the housing body, and such that the main surfaces contact along abutment surfaces surrounding the apertures of the housing body.

4. A head-mounted picture display device according to claim 3, wherein the housing body has convex parts by which the transparent plates are secured when press-fitted into the apertures; and each convex part is formed along at least one side of a corresponding one of the apertures such that when the corresponding transparent plate is press-fitted into the respective aperture, a substantially enclosed tapered space is formed between mutually facing surfaces along the circumference of the transparent plate, the circumference of the housing body forming the aperture, and the convex part.

5. A head-mounted picture display device, comprising:

a picture display system including picture display members for producing pictures transmitted by a supplied video signal, and optical elements for introducing beams which transmit the pictures produced by the picture display members to an observer's eyes; and a housing body accommodating the picture display system, wherein the housing body has light transmitting portions formed by apertures which permit propagation of the beams emitted from the optical elements towards the observer's eyes, the apertures being covered with transparent plates; and the transparent plates are fitted in the apertures so that center positions thereof are not aligned with the beams emitted from the optical elements.

6. A head-mounted picture display device according to claim 5, wherein the transparent plates each have a beam transmission area through which a beam emitted from an optical element passes, and a frame area surrounding the beam transmission area; and a vertical width of a lower part of the frame area is smaller than a width of an upper part thereof.

7. A head-mounted picture display device according to claim 5, wherein the transparent plates each have a beam transmission area through which a beam emitted from an optical element passes, and a frame area surrounding the beam transmission area; and a lateral width of a portion of the frame area designed to be positioned furthest away from the observer's nose when the display device is worn is relatively smaller than a width of a portion thereof designed to be positioned closer to the observer's nose.

8. A head-mounted picture display device, comprising:

picture display members for producing pictures transmitted by a supplied video signal;

optical elements for introducing beams which transmit the pictures produced by the picture display members to an observer's eyes; and window frame members for restricting a range in which the beams can emanate from the optical elements and propagate towards the observer's eyes to thus limit a view zone, wherein the window frame members are formed so that center positions of light transmission areas thereof are not aligned with the beams emitted from the optical elements.

9. A head-mounted picture display device according to claim 8, wherein the window frame members are formed so that a vertical width of an upper frame part thereof is relatively larger than a width of a lower frame part thereof.

10. A head-mounted picture display device according to claim 8, wherein the window frame members are formed so that a lateral width of a portion thereof designed to be positioned closer to the observer's nose when the device is worn is relatively larger than a width of a portion thereof designed to be positioned away from the observer's nose.

* * * * *